(12) United States Patent
Yao et al.

(10) Patent No.: US 6,368,751 B1
(45) Date of Patent: Apr. 9, 2002

(54) ELECTROCHEMICAL ELECTRODE FOR FUEL CELL

(75) Inventors: Wayne Yao, Saddle Brook, NJ (US); Tsepin Tsai, Chappaqua, NY (US)

(73) Assignee: Reves, Inc., Elmsford, NY (US)

( * ) Notice: Subject to any disclaimer, the term of this patent is extended or adjusted under 35 U.S.C. 154(b) by 0 days.

(21) Appl. No.: 09/415,449

(22) Filed: Oct. 8, 1999

(51) Int. Cl.[7] .............................. H01M 4/80
(52) U.S. Cl. ............... 429/235; 429/233; 429/242; 429/245; 429/42; 429/44; 429/45
(58) Field of Search .................. 429/233, 235, 429/242, 245, 42, 44, 45

(56) References Cited

U.S. PATENT DOCUMENTS

| | | | |
|---|---|---|---|
| 4,129,633 A | 12/1978 | Biddick | 264/40.3 |
| 4,339,325 A | 7/1982 | Solomon et al. | 429/42 |
| 4,405,544 A | 9/1983 | Solomon | 264/127 |
| 4,444,852 A * | 4/1984 | Liu et al. | 429/42 |
| 4,615,954 A | 10/1986 | Solomon et al. | 429/27 |
| 4,626,482 A | 12/1986 | Hamlen et al. | 429/27 |
| 4,877,694 A | 10/1989 | Solomon et al. | 429/212 |
| 4,885,217 A | 12/1989 | Hoge | 429/27 |
| 4,906,535 A | 3/1990 | Hoge | 429/42 |
| 4,927,514 A | 5/1990 | Solomon et al. | 429/42 |
| 4,988,581 A * | 1/1991 | Wycliffe | 429/27 |
| 5,032,473 A | 7/1991 | Hoge | 429/42 |
| 5,053,375 A | 10/1991 | Rao | 429/42 |
| 5,312,701 A | 5/1994 | Khasin et al. | 429/42 |
| 5,441,823 A | 8/1995 | Naimer et al. | 429/42 |

* cited by examiner

Primary Examiner—Laura Weiner
(74) Attorney, Agent, or Firm—Sampson & Associates

(57) ABSTRACT

An electrochemical cathode includes a porous metal foam substrate, formed with a network of interconnected pores. An active layer and a hydrophobic microporous gas diffusion layer are both disposed on one or more surfaces of the metal foam substrate. The metal foam substrate serves as the current collector of the cathode. The microporous layer is a plastic material such as a fluoropolymer (i.e., PTFE). The cathode also includes a particulate microstructure reinforced by relatively strong bonding provided by sintering a polymeric binder within the three-dimensional interconnected porosity of the metal foam substrate. The reactive layers are preferably fabricated from the same material as binder. This advantageously enables a single roll pressing operation to simultaneously impregnate the binder into the substrate and form the reactive layers thereon.

28 Claims, 3 Drawing Sheets

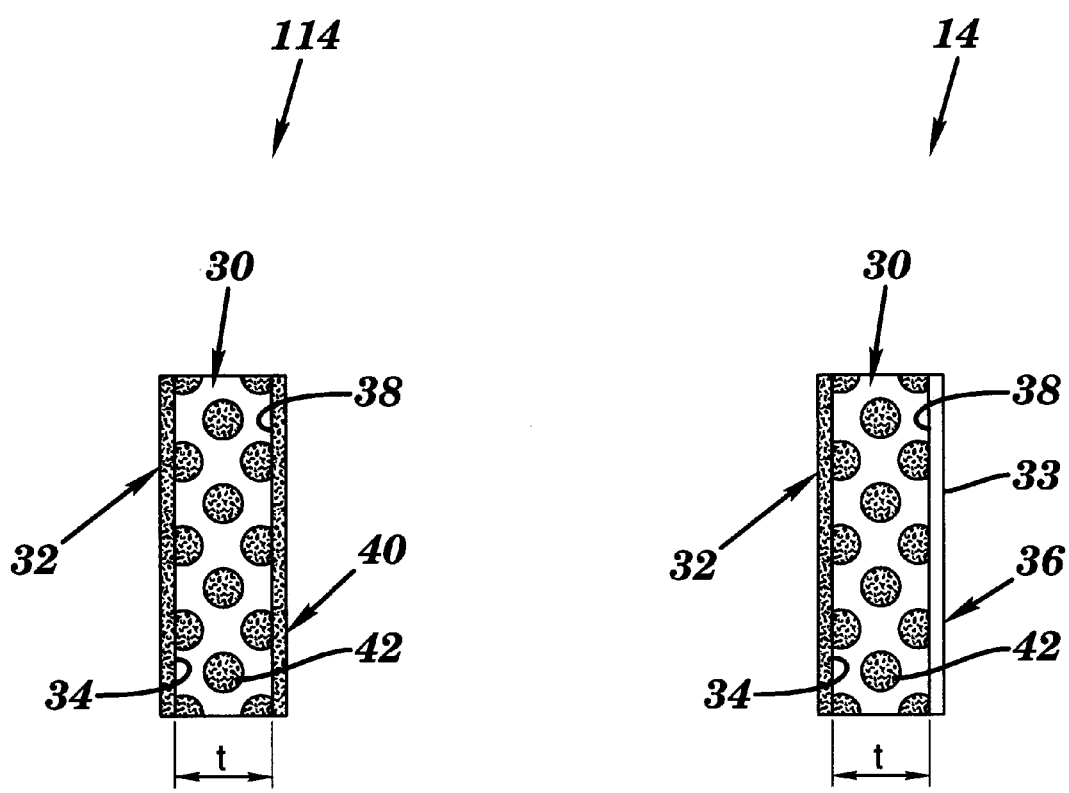

ELECTROCHEMICAL ELECTRODE FOR FUEL CELL

BACKGROUND

1. Field of the Invention

This invention relates to electrodes and a process for manufacture thereof, and more particularly to electrochemical air cathodes for use in electrochemical cells and a process for manufacture thereof.

2. Background Information

A fuel cell device generates electricity directly from a fuel source, such as hydrogen gas, natural gas, alcohol, or metal sheet, and an oxidant, such as oxygen or air. Since the process does not burn the fuel to produce heat, the thermodynamic limits on efficiency are much higher than normal power generation processes.

Metal/air fuel cells (See, for example, U.S. Pat. No. 5,250,370 to S. Faris, which is fully incorporated herein by reference) and batteries produce electricity by electrochemically coupling in a cell a reactive metallic anode to an air cathode through a suitable electrolyte. As is well known in the art, an air cathode is typically a sheet-like member having opposite surfaces respectively exposed to the atmosphere and to an aqueous electrolyte of the cell, in which (during cell operation) atmospheric oxygen dissociates while metal of the anode oxidizes providing a usable electric current flow through external circuitry connected between the anode and cathode. The air cathode must be permeable to air but substantially hydrophobic (so that aqueous electrolyte will not seep or leak through it), and must incorporate an electrically conductive element for external circuitry. See, for example, U.S. Pat. No. 5,053,375 to Bhaskara M. L. Rao.

As described in U.S. Pat. No. 4,906,535 in present-day commercial metal-air electrochemical cell practice, the air cathode is commonly constituted of active carbon (with or without an added dissociation-promotion catalyst) containing a finely divided hydrophobic polymeric material and incorporating a metal screen as the conductive element. A variety of anode metals are used including iron, zinc, magnesium, aluminum, alloys of aluminum, etc.

U.S. Pat. No. 4,129,633 discloses a method for preparing an electrode using a dry powder spread onto a moving web (dry method). Disadvantageously, this approach generally requires the use of relatively complex equipment, and it tends to be difficult to distribute the dry powder uniformly.

U.S. Pat. No. 4,339,325 to Soloman et al. describes gas diffusion electrodes and methods for the preparation thereof. This reference describes and claims a porous, coherent, unsintered, uniaxially oriented backing layer of fibrillated polytetrafluoroethylene having openings ranging from about 0.1 to 40 microns. The layer may be used as a backing layer in forming an electrode. However, the backing layer generally does not provide the structure and strength desired for relatively demanding applications.

U.S. Pat. No. 4,615,954 discloses an oxygen cathode comprising: an electrically conductive, wetproofing layer composed essentially of an intimate, consolidated and heat sintered mixture of carbon black and particulate hydrophobic polymeric binder derived predominantly from tetrafluoroethylene, having at least one anisometric electroconductive reinforcing material incorporated therein. U.S. Pat. No. 4,877,694 discloses an electrode comprising a porous, gas supplying layer containing hydrophobic polymer, and an electrolyte porous active layer comprising catalyst containing carbon particles intimately blended with hydrophilic halogenated polymer binder for catalyzed carbon particles, which intimate blend is combined in said active layer with particulate substance bound with hydrophobic polymer. In U.S. Pat. No. 4,927,514 there is disclosed an electrode in multi-layer form and having enhanced inter-layer bonding, the electrode comprising a gas porous, polymer-containing support layer, a catalyst-containing and polymer-containing active layer and a gas porous intermediate bonding layer consisting of thermoplastic hydrophobic polymer. All three of these patents rely on a relatively complex, multi-stage process for preparing the electrodes, which process is characterized by forming a hydrophobic support layer that is dried and sintered, and then depositing a further active layer on the dry support layer which is also then dried and sintered.

U.S. Pat. No. 5,312,701 discloses a relatively complex batch-style or single pass fabrication process for preparing a gas diffusion electrode for metal-air batteries and fuel cells.

U.S. Pat. No. 4,885,217 discloses a continuous web-coating method for preparing an air cathode which is comprised of a sheetlike laminate including two carbon layers having opposed surfaces, respectively exposed for contact with a liquid electrolyte and with air, and optionally having a hydrophobic microporous film. This construction uses a carbon felt skeleton to which other components are added. Although this process tends to be cost-effective for some applications, the operating current densities of the air cathode typically only range from 50 mA/cm$^2$ to 150 mA/cm$^2$.

A need exists for an electrode for electrochemical cells, and process for fabricating the electrode, that provides improved structural characteristics, that may be fabricated using cost-effective continuous processing, and which exhibits operating current densities of over about 200 mA/cm$^2$.

SUMMARY OF THE INVENTION

According to an embodiment of the present invention, an electrode for an electrochemical cell is provided. The electrode includes a current collector having a plurality of interconnected pores disposed therein, and a mixture of carbon particles and polymeric material located within the pores. The polymeric material is sintered in-situ within the pores.

In a variation of this aspect of the present invention, the electrode also includes a hydrophobic microporous membrane superposed with the current collector. In addition, the current collector is fabricated from metallic foam.

In another aspect of the present invention, a method is provided for forming an electrode for an electrochemical cell. The method includes the steps of:

providing a current collector having a plurality of interconnected pores;

disposing a carbon/polymer blend within the pores of the substrate; and sintering the polymeric binder of the carbon/polymer blend in-situ with the pores of the current collector.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 2 is an elevational schematic view, on an enlarged scale, of one embodiment of the electrode of FIG. 1;

FIG. 3 is a view similar to that of FIG. 2, of an alternate embodiment of the electrode of the present invention;

DETAILED DESCRIPTION OF THE PREFERRED EMBODIMENTS

Figure 1:
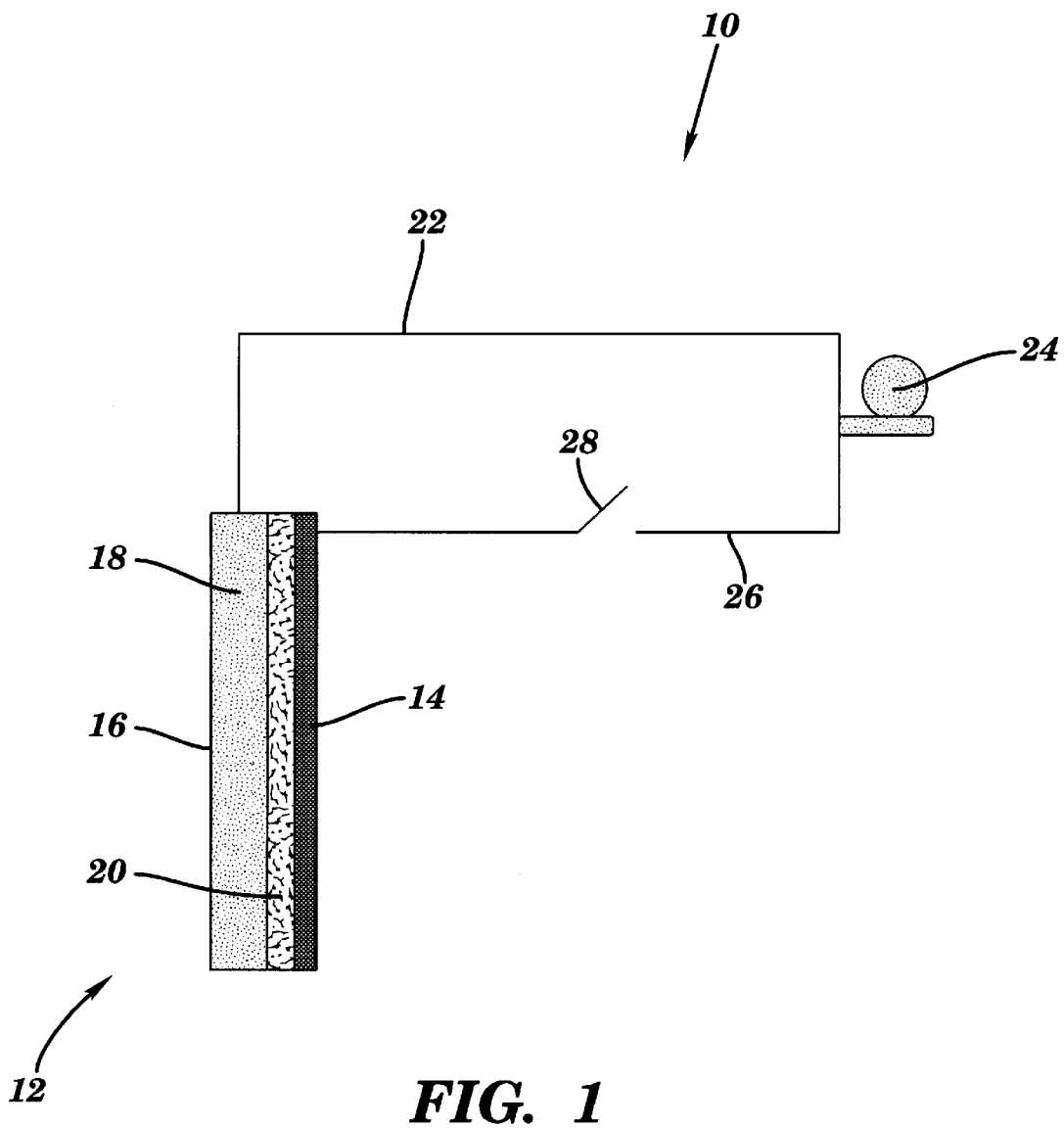
FIG. 1 is a schematic view of a circuit incorporating an electrode of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Referring now to FIG. 1, circuit 10 incorporates a metal/air fuel cell battery 12 that includes an electrochemical electrode (i.e., a cathode) 14 of the present invention, such as an air cathode as shown and described herein. The fuel cell battery 12 includes a housing 16, the cathode 14, a metal fuel (anode) 18, and a liquid electrolyte 20, such as an aqueous solution of potassium hydroxide and/or sodium chloride. The metal fuel (anode) 18 is connected by an electrical conductor (line) 22 to a load (i.e., light bulb) 24, which in turn, is connected by a conductor 26 including a switch 28 to the air cathode 14. Closing the switch 28 completes an electrical circuit formed between the air cathode 14 and the metal fuel (anode) 18 via the electrolyte 20 to illuminate the light bulb 24. Once the metal fuel (anode) gets consumed, a new metal fuel (anode) may be inserted to continue to generate electricity to power the light bulb.

The metal fuel (anode) 18 may be formed of a suitable anodic material, such as zinc, aluminum, magnesium, alloys, or the like. The metal fuel (anode) 18 is disposed in spaced apart, parallel relationship with the cathode 14, with a distance therebetween sufficient to form a gap for the electrolyte 20. The general arrangement of the metal/air fuel cell battery 12 may be substantially the same as that of one of the cells of a conventional multi-cell battery, such as described in U.S. Pat. No. 4,626,482, which is fully incorporated by reference herein.

Referring now to FIG. 2, the structure of one embodiment of electrochemical electrode (i.e., cathode) 14 is shown. The cathode 14 includes a porous metal foam substrate 30, formed with a network of interconnected pores, with one or more active (also referred to as reactive) layers 32 disposed on a surface 34 thereof. A hydrophobic microporous layer (also referred to as a gas diffusion layer) 36 is disposed on opposite side 38 of the metal foam substrate 30. As also shown, as a variation of this embodiment, an optional reactive layer 33, of similar construction though preferably thinner in the transverse direction, to that of layer 32, may be superposed between the surface 38 and the microporous layer 36.

The metal foam substrate 30 serves as the current collector of the cathode 14, and is formed of a suitable metallic material, such as nickel, stainless steel and the like. An example of a suitable substrate material is a nickel metal foam available from RETEC Porous Metal, Ohio. It is contemplated, however, that a suitable non-metallic, porous, electrically conductive material may also be used as the substrate 30. The microporous layer 36 may be a plastic material such as a fluoropolymer (i.e., Teflon® or PTFE) or other high temperature plastic that preferably has a glass transition temperature above the cathode sintering temperature of typically about 250 degrees C. Such a high glass transition temperature advantageously permits the microporous layer 36 to be applied or otherwise disposed onto the substrate 30 prior to sintering, as will be discussed in greater detail hereinbelow.

Turning now to FIG. 3, another embodiment of the present invention is shown as electrochemical electrode (i.e., cathode) 114. This cathode 114 includes metal foam substrate 30 having respective inner and outer surfaces 34 and 38. The substrate 30 is disposed between an inner reactive layer 32 and a substantially identical outer reactive layer 40 disposed on surfaces 34 and 38, respectively. Unlike cathode 14 discussed hereinabove with respect to FIG. 2, cathode 114 utilizes an outer reactive layer 40 that does not have a hydrophobic microporous layer (layer 36, FIG. 2) superposed therewith. This embodiment of the present invention may be useful in the fuel cell and battery art.

As shown in both FIGS. 2 & 3, the cathodes 14, 114 of the present invention preferably include a particulate microstructure reinforced by relatively strong bonding provided by sintering a polymeric binder particulate 42 within the three-dimensional interconnected porosity of the metal foam substrate 30. In preferred embodiments of the present invention, the three-dimensional porous metal foam substrate 30 has a thickness t ranging from about 0.3 mm to 5 mm, and pore sizes ranging from about 200 microns to 600 microns, with the porosity ranging from about 50% to 98%. The binder particulate 42 is impregnated within the three-dimensional porous substrate 30 with a solid loading ranging from 40 mg/cm$^3$ to 1,200 mg/cm$^3$. In a preferred embodiment, solid loading ranges from 400 mg/cm$^3$ to 1,200 mg/cm$^3$. The substrate 30, including the polymeric binder particulate 42 is squeezed by any suitable known means, such as conventional roll pressing, as will be discussed in greater detail hereinbelow. Layers 32 and 36 (FIG. 2) or layers 32 and 40 (FIG. 3) then may be applied utilizing any suitable means such as conventional coating operations or additional roll pressing steps. However, in a preferred embodiment, the reactive layers 32, 40 and/or 33 are fabricated from the same material as binder 42. This advantageously enables a single roll pressing operation to simultaneously impregnate the binder 42 into the substrate 30, and form the layers 32, 40 and/or 33 thereon.

The reactive (or gas diffusion) layers 32 and 40, as well as the binder particulate 42, are preferably fabricated from the same materials. In particular, these materials may include a hydrophobic polymeric binder applied as a liquid, i.e., a dispersion, suspension or slurry, to the surfaces 34 and/or 38 of substrate 30. Examples of such suitable hydrophobic polymeric binders include polytetrafluoroethylene (PTFE) and fluorinated ethylenepropylene copolymer (FEP). Other useful materials include halocarbons such as polychlorofluoroethylene. Mixtures of these resins may also be utilized.

In a preferred embodiment, the hydrophobic polymeric binder is combined with particulate carbon. This combination is provided by blending the particulate carbon with either a liquid dispersion of finely-divided dry hydrophobic polymer, or with the polymer in dry powder form. The polymer preferably includes about 20 to about 60 weight percent (wt. %) of the blend. This range generally provides sufficient polymer to bind substantially all of the carbon particles, without unduly reducing gas porosity or otherwise lowering electrochemical performance.

Moreover, the carbon particles are preferably catalyzed by any number of well-known catalysts applied to the carbon in a manner well-known to those skilled in the art. Examples of such suitable catalysts include magnesium oxide ($MnO_2$), silver nitrate, platinum, cobalt oxide, and combinations thereof.

Figure 4:
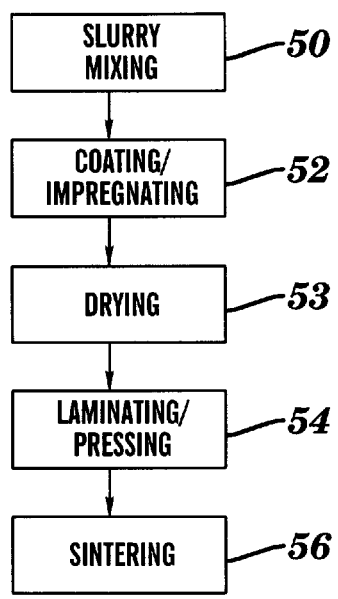
FIG. 4 is a block diagram of process steps utilized in fabricating an electrode of FIGS. 1–3.

Turning now to FIG. 4, fabrication steps of the present invention are shown. Step 50 includes mixing the desired components of the binder particulate 42, (which, as discussed above, are preferably substantially identical to the components of active layers 32, 40, and/or 33). After mixing, as shown at 52, the slurry may then be coated, pressed or otherwise impregnated into the porous metal foam substrate 30 using any of a variety of continuous web coating and/or laminating methods known to those skilled in the art, such as but not limited to, roll pressing, dip coating, extrusion die coating, roll over plate, or knife over roll, or etc. As will be familiar to those skilled in the art, the choice of such web coating/impregnating methods may be made based upon the thickness and desired solid loadings of the final electrode product. A liquid medium utilized in the liquid (i.e., slurry) may be water or a relatively low boiling-point organic solvent such as isopropyl alcohol or a blend of alcohols. The slurry is permitted to dry as shown at step 53, before commencing subsequent fabrication steps.

In the event the binder 42 utilizes a composition that is distinct from the desired composition of the reactive layers, step 50 and 52 may be repeated utilizing the particular composition desired for one or more of the reactive layers 32, 40 and/or 33. In this regard, subsequently applied layers may be superimposed or otherwise laminated upon the previously applied materials. For example, after drying, if desired, the impregnated three-dimensional porous metal foam then may be laminated or coated with a suitable material, such as Teflon® (PTFE) sheet as discussed hereinabove, to form the microporous or gas diffusion layer 36 as shown at 54. This lamination or coating may be accomplished utilizing any of the coating methods discussed hereinabove with respect to step 52, as well as other conventional lamination and pressing techniques.

As shown at 56, the entire combination of the substrate 30, binder 42 and layers disposed thereon, is then sintered by heating to a temperature within a range of about 200 to 350 degrees C., preferably to within about 250 to 350 degrees C., for a period of 0.5 to 4 hours, to produce the final electrode 14, 114 of the present invention. Preferred embodiments of this electrode have a final thickness t within a range of about 0.3 mm to 5 mm.

Although the present invention is shown and described herein primarily with respect to cathodes of an electrochemical cell, it should be recognized by those skilled in the art that the present invention may be implemented with substantially any electrode, i.e., cathode or anode, of an electrochemical cell, without departing from the spirit and scope of the present invention.

The following illustrative examples are intended to demonstrate certain aspects of the present invention. It is to be understood that these examples should not be construed as limiting.

EXAMPLE 1

An air cathode of the present invention was fabricated in the following manner.

A conductive three-dimensional porous metal foam (Retec Porous Metals, Inc.) was introduced into a continuous web machine similar to that disclosed in the aforementioned U.S. Pat. No. 4,885,217 (which is fully incorporated by reference herein) to effect coating, impregnating and drying operations. The impregnated mixture was comprised of 45 grams of an aqueous dispersion (15% solid) of Black Pearls 2000 (available from CABOT Corp.), in 300 grams of deionized water to which was added 158 grams of 4% CoTMPP (tetrakis(4-methoxyl phenyl)porphine cobalt), followed by the addition of 36 grams of Teflon® T-30 (60%) solid. The resulting impregnated carbon/polymeric binder in three-dimensional porous metal foam was passed through an oven maintained at a temperature of from 200 to 350 C, and hence the web is passed together with a microporous Teflon sheet through laminating rolls at nip pressure of 100 pounds per linear inch at a temperature of from 250 to 350, to form an electrochemical cathode suitable for high power applications. The operating current density of this electrode may be as high as 500 mA/cm2, and the improved mechanical strength enables the electrode to function at such high-power for extended periods of operation time.

COMPARATIVE EXAMPLE

Figure 5:
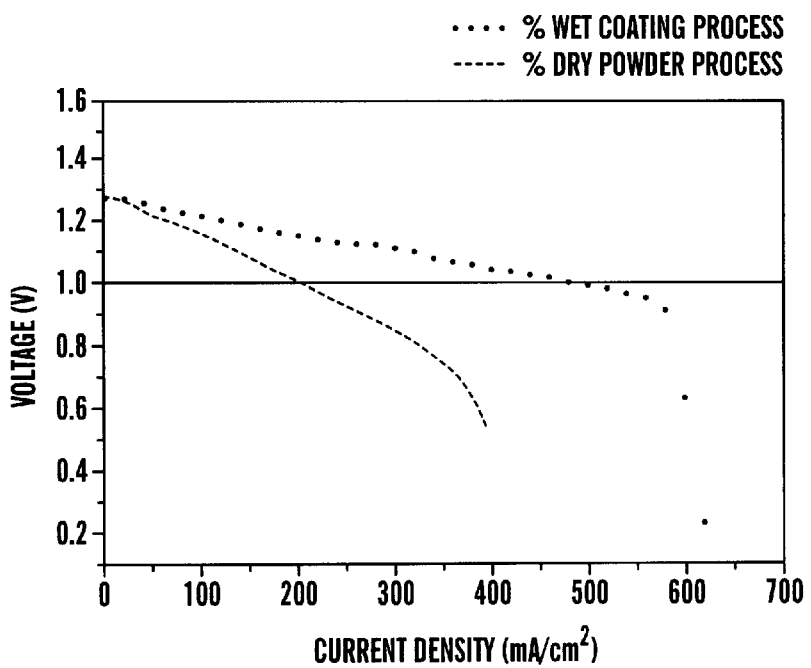
FIG. 5 is a graphical representation of the cell performance of one embodiment of the electrochemical electrode of the present invention compared to that of a conventional electrochemical electrode.

For comparison purposes another electrode having the same structure and chemical composition was fabricated using the dry powder method disclosed in U.S. Pat. No. 4,129,633. The performance of this electrode was characterized by a plot of voltage versus current density, and compared to the electrode of the foregoing Example 1 fabricated according to the present invention. The performance of the electrode fabricated through the dry powder method was found to be relatively inferior compared to the one fabricated through the method of the present invention, as shown in FIG. 5. The relatively poor performance of electrode fabricated through dry powder method was apparently due to poor uniformity of the polymer relative to that of the present invention.

FIG. 5 illustrates the respective performance of electrodes (cathodes) prepared using wet coating and dry powder processes. The cell performance of the cathode fabricated by the wet coating process at a discharge voltage of 1 volt (V) is approximately 500 $mA/cm^2$, while the cell performance of the similar cathode fabricated by the dry powder process at a discharge voltage of 1 V is only about 200 $mA/cm^2$. These results indicate that the wet coating process of the present invention is superior to dry powder processes in fabricating high-performance air cathodes.

It has been found that there are many advantages associated with the electrode of the present invention, such as higher current collection efficiency, and thus higher operating current density; and improved bonding between metal foam and composite materials for a more robust electrode structure, and thus extended operating lifetime.

In particular, the electrode of the present invention provides stable high power electrode performance with improved mechanical strength compared with prior art electrodes. Electrodes produced according to the present invention have been shown to produce superior results relative to electrodes that utilize conventional mesh supporting structure/substrates. Advantageously, the three-dimensional porous structure of the present invention provides a network of interconnected pores that provide relatively high surface area available for mechanically bonding to the sintered carbon/polymer material 42 impregnated therein. The superior results of the present invention are thus due in large part to the relatively improved mechanical strength provided by the three-dimensional porous metal foam structure of the substrate 30, as interlocked with sintered polymeric binder 42. These electrodes of the present invention also provide superior performance relative to electrodes reinforced by carbon fibers, as the carbon fibers tend to delaminate from the metallic current collector portions thereof. Moreover, in addition to providing robust structural integrity, the three-dimensional porous metal foam substrate 30 tends to improve current collection efficiency by providing a larger surface area per unit volume than conventional flat or meshed current collectors having only non-interconnected recesses or voids.

Such improved mechanical strength has been found to be particularly useful in metal-air fuel cell and battery applications. For instance, mechanical wear and tear requirements may be particularly severe for electric vehicle applications having mechanically rechargeable metal fuels (anodes). In this regard, the gas electrode generally forms an external exposed wall of the electrochemical cell, which must substantially prevent leakage of electrolyte in metal-air, electrosynthesis cells or fuel cell systems.

Moreover, the present invention advantageously exhibits improved retention of the catalyst in systems using alkaline electrolytes and improved water penetration resistance and corrosion resistance, relative to the prior art. Further, the present invention advantageously enables the materials of the various components to be applied to the substrate in a continuous process prior to heat treatment (sintering).

The present invention thus provides a novel and cost-effective process for producing the improved cathode for electrochemical cells.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. An electrode for an electrochemical cell, said electrode comprising:
    a metallic foam current collector having a plurality of interconnected pores disposed therein;
    a mixture of carbon particles and polymeric material disposed within said pores;
    said polymeric material being sintered in-situ within said pores.

2. The electrode of claim 1, further comprising a hydrophobic microporous membrane superposed with said current collector.

3. The electrode of claim 1, wherein said current collector has about 50 to 98 percent porosity.

4. The electrode of claim 1, wherein said carbon particles comprise catalyzed carbon.

5. The electrode of claim 4, wherein said catalyzed carbon comprises a catalyst selected from the group consisting of magnesium oxide ($MnO_2$), silver nitrate, platinum, cobalt oxide, and combinations thereof.

6. The electrode of claim 1, wherein said polymeric material is non-fibrous.

7. The electrode of claim 1, wherein said carbon particles are non-fibrous.

8. The electrode of claim 1, further comprising an air cathode for a fuel cell.

9. The electrode of claim 1, further comprising an active layer disposed on a surface of said current collector.

10. The electrode of claim 9, wherein said active layer is fabricated from said carbon/polymer mixture.

11. The electrode of claim 9, further comprising an active layer disposed on a plurality of surfaces of said current collector.

12. The electrode of claim 11, further comprising an active layer disposed on opposite sides of said current collector.

13. A cathode for an electrochemical cell, the cathode comprising:
    a metallic foam current collector member having a plurality of interconnected pores;
    a mixture of catalyzed carbon particles and a non-fibrous polymeric material impregnated into said pores;
    said polymeric material being sintered in-situ within said pores; and
    a hydrophobic microporous membrane superposed with said current collector.

14. A method of forming an electrode for an electrochemical cell, said method comprising the steps of:
    (a) providing a metallic foam current collector having a plurality of interconnecting pores;
    (b) disposing a carbon/polymer blend within the pores of the current collector; and
    (c) sintering the polymeric binder of the carbon/polymer blend in-situ with the pores of the current collector.

15. The method of claim 14, wherein said disposing step (b) is implemented in a substantially continuous process.

16. The method of claim 14, further comprising the step of (d) preparing the carbon/polymer blend as a liquid prior to implementing said disposing step (b).

17. The method of claim 16, wherein said preparing step (d) comprises preparing the carbon/polymer blend as a slurry or dispersion.

18. The method of claim 14, further comprising the step of (d) disposing an active layer on the current collector.

19. The method of claim 18, wherein said disposing steps (b) and (d) are effected simultaneously.

20. The method of claim 14, further comprising the step of catalyzing the carbon of the carbon/polymer blend.

21. The method of claim 20, wherein the carbon is catalyzed by the group of catalysts consisting of magnesium oxide ($MnO_2$), silver nitrate, platinum, cobalt oxide, and combinations thereof.

22. The method of claim 14, wherein the electrode comprises an air cathode for a fuel cell.

23. The method of claim 14, further comprising the step of superposing a hydrophobic microporous membrane with the current collector.

24. The method of claim 23, wherein the microporous membrane comprises a flouropolymer.

25. The method of claim 24, wherein said fluoropolymer comprises polytetrafluoroethylene.

26. A method of forming an electrode for an electrochemical cell, said method comprising the steps of:
    (a) providing a metallic foam current collector having a plurality of interconnecting pores;
    (b) providing a polymeric binder;
    (c) mixing carbon with the polymeric binder to form a carbon/polymer blend;
    (d) preparing the carbon/polymer blend as a liquid, dispersion or slurry;
    (e) disposing a carbon/polymer blend within the pores of the current collector;
    (f) effecting said disposing step (e) in a substantially continuous process;
    (g) disposing an active layer on the substrate; and (h) sintering the polymeric binder of the carbon/polymer blend in-situ with the pores of the current collector.

27. A method of forming an electrode for an electrochemical cell, said method comprising the steps of:
   (a) providing a current collector having a plurality of interconnecting pores, wherein said current collector comprises about 70 to about 98 percent porosity;
   (b) disposing a carbon/polymer blend within the pores of the current collector; and
   (c) sintering the polymeric binder of the carbon/polymer blend in-situ with the pores of the current collector.

28. An electrode for an electrochemical cell, said electrode comprising:
   a current collector having a plurality of interconnected pores disposed therein, wherein said current collector has about 50 to about 98 percent porosity;
   a mixture of carbon particles and polymeric material disposed within said pores;
   said polymeric material being sintered in-situ within said pores.

* * * * *